US012695368B1

(12) United States Patent　　　　　(10) Patent No.:　US 12,695,368 B1

Smith　　　　　　　　　　　　　　　　　　(45) Date of Patent:　Jul. 28, 2026

(54) LOAD SWITCH HAVING CURRENT-RAMPING SOFT START

(71) Applicant: Apogee Semiconductor, Inc., Plano, TX (US)

(72) Inventor: Brett E. Smith, Fayette, IA (US)

(73) Assignee: Apogee Semiconductor, Inc., Plano, TX (US)

( * ) Notice: Subject to any disclaimer, the term of this patent is extended or adjusted under 35 U.S.C. 154(b) by 0 days.

(21) Appl. No.: 19/539,560

(22) Filed: Feb. 13, 2026

(51) Int. Cl.
| | |
|---|---|
| *H02M 1/00* | (2007.01) |
| *H02M 1/08* | (2006.01) |
| *H02M 1/36* | (2007.01) |
| *H02M 3/156* | (2006.01) |
| *H02M 1/088* | (2006.01) |

(52) U.S. Cl.
CPC ........... *H02M 1/0009* (2021.05); *H02M 1/08* (2013.01); *H02M 3/156* (2013.01); *H02M 1/088* (2013.01); *H02M 1/36* (2013.01)

(58) Field of Classification Search
CPC ....... H02M 1/0009; H02M 1/088; H02M 1/36
See application file for complete search history.

(56) References Cited

U.S. PATENT DOCUMENTS

| | | | | |
|---|---|---|---|---|
| 2012/0126765 A1* | 5/2012 | Stone | .................. | H02M 3/1588 |
| | | | | 323/283 |
| 2014/0253072 A1* | 9/2014 | Hussien | .................. | H02M 1/36 |
| | | | | 323/288 |
| 2015/0256060 A1* | 9/2015 | Faingersh | ............... | H02M 1/36 |
| | | | | 323/267 |

OTHER PUBLICATIONS

Mak, B., Basics of Load Switches, Texas Instruments Application Report, Apr. 2014, revised Sep. 2018. https://www.ti.com/lit/an/slva652a/slva652a.pdf.

Cadence, How Soft-Start Circuits Work, Cadence PCB Solutions blog entry, date unknown. https://resources.pcb.cadence.com/blog/how-soft-start-circuits-work.

Feldman, R., RAQ Issue 223: How to Measure and Determine Soft Start Timing When There Is No Soft Start Equation?, Analog Dialogue Rarely Asked Questions, Issue 223, May 2024. https://www.analog.com/media/en/analog-dialogue/raqs/raq-issue-223.pdf.

Analog Devices, LT8362 DC/DC converter data sheet, Rev. B, Feb. 2021. https://www.analog.com/media/en/technical-documentation/data-sheets/lt8362.pdf.

Zhao, L., Gu, M. and He, A., , Understanding Soft Start of TPS56837, Texas Instruments Application Note, Nov. 2023. https://www.ti.com/lit/an/sluaat3/sluaat3.pdf?ts=1770798907603.

* cited by examiner

*Primary Examiner* — Gary A Nash

(74) *Attorney, Agent, or Firm* — Gregory A. Magel

(57) ABSTRACT

A load switch with a soft start feature operates an MOS power device as a current source having a limited current capability. During a soft start ramp period, the power device is driven under feedback control such that a gradually-increasing servo current through a reference device of the same type and driven by the same gate drive voltage follows a ramp signal. The ramp signal may be generated using a current source to charge a soft start capacitor. Substantially matched load switches connected in parallel, each incorporating such a ramp generator, may share a single soft start capacitor to synchronize their ramp signals and balance power dissipation during soft start as well as during continuous operation. Load switch integrated circuits and coordinated systems of load switches are also provided, as are methods of performing soft start and coordinating the soft start of a system of load switches.

24 Claims, 7 Drawing Sheets

LOAD SWITCH HAVING
CURRENT-RAMPING SOFT START

This invention was made with government support under Award Number 80NSSC24CA183, awarded by the National Aeronautics and Space Administration. The government has certain rights in the invention.

BACKGROUND OF THE INVENTION

1. Field of the Invention

The present invention relates generally to integrated circuits, and, more particularly, to power management integrated circuits used as load switches to connect a power supply to a load.

2. Description of the Related Art

Power management integrated circuits (ICs) are used in a wide variety of commercial and military applications, to optimize power consumption and/or to prevent catastrophic events. They find use in many types of systems, from handheld devices to automotive and aerospace vehicles. One type of power management circuit is a load switch used to control the connection of one or more power supplies to one or more loads. Load switches can be used to turn on and off power to various types of loads, including high-dissipation loads such as heaters, in order to lower power consumption, or to isolate faults such as short circuits. Load switches are often used to turn off unused portions of circuitry so as to optimize power consumption in systems that run on battery power or with other limited power sources, including in space applications. Other applications of load switches include switching between primary supplies and backup supplies to implement redundancy, or between different supplies in order to change voltages for different functions, or to progressively enable multiple supplies in order to sequence startup in a complicated system. In some high-reliability applications, multiple loads may be powered one at a time from a single power supply (cold-sparing the load), with idle loads disconnected by load switches in order minimize power consumption.

In some applications, an integrated circuit implementing load switch functions may drive an external power device optimized for high-voltage and/or high-current operation, in which case the IC may be referred to as a "load switch controller," as opposed to a "load switch IC" or "integrated load switch." But if supply voltages and power dissipation capabilities permit, the power device can be integrated onto the same IC substrate as the load switch controller circuitry, combining multiple functions into a single device, including the power device, driver circuitry, and protection features, and eliminating the need for some external components, simplifying system design and reducing system cost. Integration of the power device offers several advantages, such as enhanced monitoring of temperature and current in the power device, lower inductance and faster switching, as well as reduced parts count, smaller form factors, and higher reliability. Integrated load switches can also provide more reliable and consistent performance due to the tight integration of components and better control over manufacturing processes. A load switch IC may be designed to accommodate a variety of types of loads and offered commercially as a general-purpose load switch. However, designing a versatile load switch circuit can be more challenging than designing a switch that is purpose-built for a known load, since the properties of the various loads that may be encountered in different applications, such as impedance and capacitance, are unknown a priori to the circuit designer.

Features such as inrush current limiting ("soft start"), as well as various fault protection functions are often included in a load switch IC. Possible fault protection features include current or voltage limiting, reverse current or voltage protection, overtemperature, overcurrent, or overvoltage detection. Detection of a fault may be used for turning off the output, or shutdown of the entire load switch IC; or also used in generation of a fault notification signal at a fault output pin. A related power management IC referred to as an "eFuse" can have many of the same features as a load switch IC, such as current limiting and reverse current protection, but is primarily used to protect a system by quickly shutting down the output to the load if overvoltage, overcurrent, or overtemperature conditions are sensed, such as in a short-circuit condition.

The power device in a load switch IC is typically a high-side semiconductor switch used as a pass element connected in series between the power supply and a load. Since it is desirable to minimize the voltage drop and power dissipation in the pass element, a low-on-resistance MOSFET is frequently used as the power device. Using a PMOS transistor, as opposed to an NMOS, can permit the high-side switch to be turned on and off to provide the same supply voltage $V_{SUPPLY}$ to the load as powers the load switch IC, without requiring provision of a voltage higher than $V_{SUPPLY}$ to the power device gate, as would be needed to turn on an NMOS power device.

Since the current handling and power dissipation of a single load switch IC are limited, it may also be desirable to enable the connection of multiple load switch ICs in parallel to drive a larger load. The requirement of allowing operation in parallel raises additional design considerations. To realize the full benefit of operation in parallel, it is important to have even sharing of power dissipation between multiple load switches. This requires a degree of matching of the characteristics of the parallel power devices, as well as their drive parameters.

An important feature of load switches is the prevention of a high inrush current that can occur by turning on a capacitive load too rapidly. A high inrush current can cause a transient drop in supply voltage that can cause instability or malfunction of other parts of a system that are connected to the same supply. Limiting inrush current is typically accomplished by implementing a soft start function that controls the slew rate, or rise time, of the load switch output voltage during a pre-drive period, thereby minimizing the sag on the input voltage. This allows the load capacitance to be charged gradually during the pre-drive period, before switching the power device to its full drive capability for static and dynamic loads.

The output voltage is typically controlled during soft start to slew at a rate which can be set either to a fixed or a configurable value, by circuitry internal to the load switch IC, and/or possibly using additional external circuitry and components such as a capacitor or resistor. Feedback control of the output voltage is commonly used to cause the load voltage to rise at the prescribed slew rate. Voltage feedback works fine for a single load switch connected to a load. But when attempting to use multiple load switches that are connected in parallel to a single load, to increase current capacity and reduce on resistance with their outputs connected together, small variations in circuit parameters can lead to very poor current sharing (current hogging) between the load switches all attempting to control the same load voltage, and thus very uneven power dissipation sharing during the soft start. This can lead to overheating of the load switch that grabs the largest share of the current during soft start, triggering operation of its thermal shutdown circuitry, thus resulting in unstable system startup behavior.

There is thus a need for improved load switches having soft start capability and able to handle unpredictable loads, as well as methods of coordinating load switches that are connected in parallel to prevent uneven power dissipation between the switches.

SUMMARY OF THE INVENTION

Accordingly, load switches are provided that feature inrush current limiting based on gradually increasing the instantaneous current capability of an MOS power device during a soft start pre-drive period, instead of controlling a voltage slew rate of the load switch output. Since the current output of the load switch starts at a very low level and ramps softly during startup, the power dissipation in the power device starts low and ramps softly as well, allowing any thermal protection to protect the power device if the output is shorted during initial startup so that the load current exceeds a rated current capability. During the soft start period, the load capacitance is charged with a limited current. After the soft start period, the load capacitance has been charged, and the power device is switched to being driven with a gate voltage that turns it fully on for continuous operation.

During the soft start period, the instantaneous current capability of the power device is constrained to follow a ramp signal under closed-loop control of its gate drive voltage, using a feedback circuit that senses a current through a reference device of the same type as the power device and driven by the same gate voltage. The reference device may be sized smaller than the power device. The ramp signal may vary linearly with time, and may be produced using a ramp generator comprising a current source charging a soft start capacitor. In the case that the load switch is implemented as an integrated circuit that includes such a ramp generator, a soft start capacitor may be an external component attached to a soft start connection on the load switch IC.

Multiple load switch ICs can be connected in parallel to drive larger loads than can be handled by a single unit due to current handling and power dissipation limits of the power devices. Maximum benefit from operating load switch ICs in parallel can be obtained by substantially matching the characteristics of the power devices and the circuitry that drives them, facilitating even sharing of load current, so that a minimum number of ICs need be connected in parallel in a system driving a given load, and thermal shutdown or overcurrent protection will tend to occur at approximately the same time for all of the ICs. Using a shared external soft start capacitor connected to all of the soft start connections on matched load switch ICs enables improved balancing of current, and hence power dissipation, during the soft start ramp period as well as during continuous operation.

In particular, a load switch having current-ramping soft start is provided that controls a current from a power supply to a load. A power device that is a type of MOS transistor driven by a gate drive voltage controls the load current, and a reference device of the same type as the power device is driven by the same gate drive voltage. The reference device passes a servo current proportional to the instantaneous current capability of the power device. During a soft start ramp period that starts when an enable signal changes from inactive to active, a feedback circuit adjusts the gate drive voltage so as to control the servo current to follow a ramp signal that varies gradually during a soft start ramp period, from a starting voltage corresponding to the power device being fully off, to an endpoint voltage corresponding to the power device operating at a target current capability. When the endpoint voltage is reached and the enable signal is still active, the power device is turned fully on. In this way, the power device is operated as a current source having a limited current capability that gradually increases during the soft start ramp period, charging the load capacitance with a limited inrush current before switching fully on for continuous operation.

In some embodiments, the reference device may be sized to have a lower current capability proportional to that of the power device for the same gate drive voltage. The power device and reference device may be PMOS transistors. The ramp signal may be a ramp voltage that changes with time. The ramp generator may comprise a current source charging a soft start capacitor. An endpoint evaluation circuit generates a DONE signal that is active when the endpoint voltage is reached at the end of a soft start ramp period and inactive during the soft start ramp period and when the enable signal is inactive; in some embodiments the endpoint evaluation circuit compares the ramp voltage to the endpoint voltage to generate the DONE signal. In some embodiments, the target current capability is greater than the rated current capability, and in some embodiments exceeds the rated current capability by twenty percent or more before the gate drive voltage is switched to drive the power device fully on. The ramp voltage may be clamped to a maximum voltage that is higher than the endpoint voltage but less than the supply voltage. The soft start ramp period may be between approximately one hundred microseconds and approximately 10 milliseconds.

A load switch integrated circuit having current-ramping soft start is also provided, in which a load switch circuit is formed on the surface of a semiconductor substrate. The load switch integrated circuit has at least power supply, ground, load, enable, and soft start connections. The soft start connection is connected to a ramp voltage node carrying a ramp signal that is reset to a starting voltage corresponding to the power device being fully off when the enable signal is inactive, and varies gradually during a soft start ramp period that starts when the enable signal changes from inactive to active and that ends when the power device instantaneous current capability reaches a target current capability. A power device that is a type of MOS transistor driven by a gate drive voltage controls the load current, and a reference device of the same type as the power device is driven by the same gate drive voltage. The reference device passes a servo current proportional to the instantaneous current capability of the power device. During the soft start ramp period, a feedback circuit adjusts the gate drive voltage so as to control the servo current to follow the ramp signal. A gate control circuit includes an endpoint evaluation circuit generating a DONE signal that is inactive while the enable signal is inactive as well as during the soft start ramp period and that transitions from inactive to active at the end of the soft start ramp period. A gate drive circuit including the feedback circuit accepts the enable signal, the ramp signal, and DONE signal and provides the gate drive voltage to turn the power device fully off when the enable signal is inactive, gradually increase the instantaneous current capability of the power device from fully off to the target current capability during the soft start ramp period, and turn the power device fully on when both the enable signal and the DONE signal are active. In some embodiments, the load switch IC is packaged in an integrated circuit package encapsulating the semiconductor substrate and having terminals (pads, leads, lands, or pins, etc.) connected to the power, ground, and other connections.

Also provided is a coordinated system of load switches comprising a plurality of load switches connected in parallel between a power supply and a load, that makes use of the inventive features of the load switches and load switch integrated circuit described above, in order to balance power dissipation substantially evenly between the load switches during the soft start ramp period as well as during continuous operation. Parameters of at least the power devices, the reference devices, the ramp signals, the endpoint evaluation circuits, and the gate drive circuits are matched between the load switches within a set of tolerances sufficient to balance the power dissipation. In some embodiments, an external ramp generator accepts the enable signal and provides a ramp signal to a soft start connection on each load switch that is connected to a ramp voltage node in the load switch. In some embodiments, ramp generators are separately incorporated into each load switch and parameters of the ramp generators and the endpoint evaluation circuits are matched to within sufficiently tight tolerances so as to generate substantially matched and synchronized ramp and DONE signals for current balancing. In some embodiments, separate ramp generators may comprise a current source charging a capacitance at the ramp voltage node to generate the ramp signal. In this situation, a single soft start capacitor connected to all of the soft start connections can be shared by load switches to eliminate differences in ramp signals, since variations caused by the separate current sources (which are summed, in embodiments in which the ramp voltage nodes are connected together) and capacitor tolerances are eliminated using a single capacitor in this way.

A method of performing a soft start of a load switch having an MOS power device is additionally provided. The method starts with the power device turned off, and then the current capability of the power device is gradually increased over a soft start ramp period, using closed-loop control of a gate drive voltage to follow a ramp signal, while sensing a current through a reference device of the same type and driven by the same gate drive voltage. When the current capability reaches a predetermined target current capability, the power device is turned fully on. In some embodiments, the target current capability is greater than the rated current capability. In some embodiments, the reference device is sized to have a lower current capability than the power device for the same gate drive voltage. In some embodiments, the ramp signal varies linearly over the soft start ramp period; this can be accomplished in some embodiments by charging a capacitor with a constant current source. In some embodiments, the soft start ramp period is in the range of approximately one hundred microseconds to approximately ten milliseconds.

Finally, a method of coordinating soft start of a plurality of load switches connected in parallel to a load is also provided. Each load switch has a soft start connection, an MOS power device with a rated current capability, and gate drive circuitry; the power devices and gate drive circuitry have parameters matched to within predetermined tolerances to facilitate balancing of power dissipation. The method starts with all power devices turned off, a matching ramp signal is provided to the soft start connection on each load switch. For each load switch, the instantaneous current capability of the power device is gradually increased over a soft start ramp period, during which the gate drive circuitry employs closed-loop control of the current through a reference device to follow the ramp signal. When the instantaneous current capability of the power device reaches a common predetermined target current capability, the power device is turned fully on.

In some embodiments, the target current capability is greater than the rated current capability. In some embodiments, the reference device is sized to have a lower current capability than the power device for the same gate drive voltage. In some embodiments, the ramp signal varies linearly over the soft start ramp period; this can be accomplished in some embodiments by charging a capacitor with a constant current source. In this situation, one soft start capacitor connected to all of the soft start connections can be shared by load switches to eliminate differences in ramp signals, since variations caused by the separate current sources (which are summed, in embodiments in which the ramp voltage nodes are connected together) and capacitor tolerances are eliminated using a single capacitor in this way. In some embodiments, the soft start ramp period is in the range of approximately one hundred microseconds to approximately ten milliseconds.

The load switches and methods provided herein accomplish inrush current limiting during soft start while allowing multiple devices to be used in parallel without current hogging. The power dissipation in each load switch ramps softly, while the inventive features provide enhanced balancing of power dissipation during soft start as well as in continuous operation. The soft start solution described herein has advantages over conventional soft start circuits in that the current capability of the power device is regulated to follow a determinate waveform that is stable across changes or variations in the supply, temperature, or loading.

Other features and advantages of the present invention will be apparent to those skilled in the art upon reference to the following detailed description taken in conjunction with the accompanying drawings, which are to be understood to be exemplary and explanatory, and are intended to provide further explanation of the invention as claimed.

DETAILED DESCRIPTION OF THE PREFERRED EMBODIMENTS

The following Detailed Description is merely exemplary in nature and is not intended to limit the various embodiments or the application and uses thereof. Furthermore, there is no intention to be bound by any theory presented in the preceding background or the following detailed description. The techniques and structures described below may be applied in fields and applications beyond those specified here as examples, and the disclosed invention is therefore not to be considered limited to the applications and examples used here for the sake of explaining its principles of operation.

As is known to those skilled in the art, digital logic signals described herein may be designed using either positive or negative logic. In the case of a negative logic signal, the signal is active low where the logically true state corresponds to a logic level zero. In the case of a positive logic signal, the signal is active high where the logically true state corresponds to a logic level one. Note that any of the logic signals described herein can be designed as either negative or positive logic signals, and therefore in alternate embodiments, those signals described as positive logic signals may be implemented as negative logic signals, and vice versa. In the following, the terms "active" and "inactive" will be used in preference to "high" and "low" or "true" and "false." As is known by those skilled in the art, combinational logic may be implemented equivalently in alternate embodiments that operate on opposite-polarity logic signals by applying De Morgan's laws. The term "connect" for a logic signal is used herein to imply a general logical connection that may for practical circuit purposes include, e.g., buffering or inversion stages. Analog signals may likewise operate in either a voltage or current domain as may be expedient in a given circuit design and technology, e.g., in a CMOS integrated circuit, with appropriate adaptation of interface circuitry.

Figure 1A:
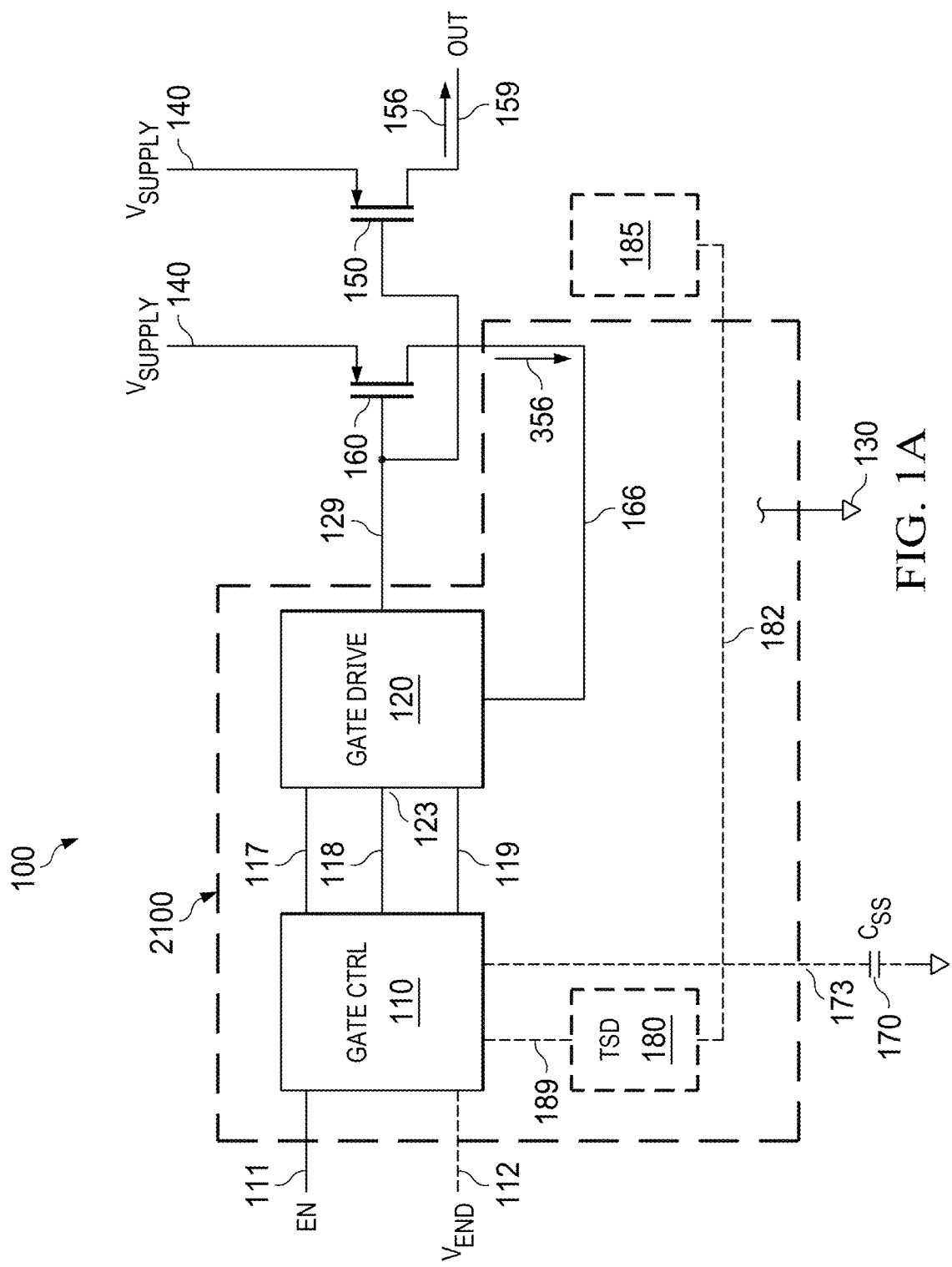
FIG. 1A is a schematic block diagram of a load switch having current-ramping soft start.

Referring now to FIG. 1A, a schematic block diagram of a load switch 100 having current-ramping soft start is shown. In this embodiment, power device 150 is a PMOS transistor acting as a high-side switch connecting a power supply at voltage $V_{SUPPLY}$ from supply connection 140 to a load (not shown) between output 159 and ground 130. Since power device 150 is a MOSFET, the amount of available output current 156 is regulated by the voltage of a gate drive signal 129 connected to the gate of power device 150. The operation of reference device 160, which is of the same type as power device 150, will be described shortly. For the PMOS devices 150 and 160 shown, the current capability increases, i.e., the devices turn on more fully, with more negative gate drive voltages. Power device 150 and reference device 160 are turned fully off when their gate drive voltages=$V_{SUPPLY}$. It is expedient to use PMOS devices for high-side switches in IC load switches because they do not require generating a gate drive voltage higher than $V_{SUPPLY}$ to operate between fully on and fully off, thus reducing circuit complexity.

Reference device 160 is of the same type as power device 150, is connected in the same way to power supply 140, and is driven by the same gate drive signal 129. Devices 150 and 160 are preferably fabricated using the same process on the same substrate as each other, so that their drive characteristics match more closely and they are thermally connected. This is readily accomplished in embodiments of load switch 100 as an integrated circuit. Gate drive circuit 120 generates gate drive signal 129 that operates devices 150 and 160, and incorporates a feedback circuit accepting feedback signal 166 that is based on sensing a servo current 356 flowing through reference device 160. If reference device 160 were identical to power device 150 in structure and dimensions, then servo current 356 would be the same magnitude as output current 156 when devices 150 and 160 are operating in saturation, i.e. as resistances. In a preferred embodiment, reference device 160 is scaled smaller than power device 150 so that servo current 356 is a fraction of output current 156. That is, at the same drive voltage, reference device 160 has a proportionally lower current capability than power device 150. This enables feedback signal 166 to remain an accurate sense input to gate drive circuit 120, while reducing the circuit area and overhead current used in integrated circuit embodiments of load switch 100.

Load switch 100 also includes a gate control circuit 110 that coordinates load switch operation. Gate control circuit 110 accepts an enable signal 111 (EN) used to control the on/off state of power device 150, and contains enable logic and a ramp generator and related circuitry, all of which will be described in more detail later. Gate control circuit 110 provides signals to gate drive circuit 120 that include a ramp signal 118 connected at ramp input 123 and associated DONE signal 119, as well as a version 117 of enable signal 111 (EN), which may be inverted (to produce EN_BAR) or buffered as necessary. An endpoint voltage 112 ($V_{END}$) that is used in the generation of DONE signal 119 may be accepted into gate control circuit 110 from an optional external reference as shown, or generated internal to gate control circuit 110. Endpoint voltage 112 ($V_{END}$) is selected to correspond to a target current capability of power device 150 and is used to determine an end to a soft start ramp period, after which the power device is to be switched fully on for continuous operation. In some embodiments, a soft start capacitor 170 ($C_{SS}$) is used in the generation of ramp signal 118; soft start capacitor 170 may comprise an optional external component connected at a soft start connection 173 as shown.

As discussed earlier, in addition to a soft start function, load switches and other power management ICs may include circuitry to implement various other fault protection or safety features such as current or voltage limiting, reverse current or voltage protection, overtemperature, overcurrent, or overvoltage detection, or circuitry to facilitate various applications, such as fault notification, signaling, and serial and/or parallel communications, as well as functions such as power-on reset (POR). Not all of these features are necessarily included in every power management circuit, and most of these features do not interact with the soft start function, so are not illustrated. But overtemperature protection is a common feature with some relevance and is drawn as optional functional blocks in FIG. 1A. Here, a thermal shutdown circuit 180 (TSD) monitors a temperature signal 182 from temperature sensor 185 that is preferably located physically close to power device 150, and provides a thermal shutdown signal 189 to gate control circuit 110. In case of overheating of power device 150 (or indeed, of load switch 100 in general in integrated circuit embodiments), logic in gate control circuit 110 causes power device 150 to be turned off in a similar response to an inactive enable signal 111 (EN).

In some embodiments, circuitry performing the functions of gate control circuit 110 and gate drive circuit 120 may be implemented separately from power and reference devices 150 and 160 in the form of a soft start controller 2100. In such a separation, reference device 160 and power device 150 are preferably in close thermal contact, e.g., integrated on the same substrate, or at least in the same package, so that their characteristics match for optimal closed-loop operation of gate drive circuit 120 during the soft start period.

Figure 1B:
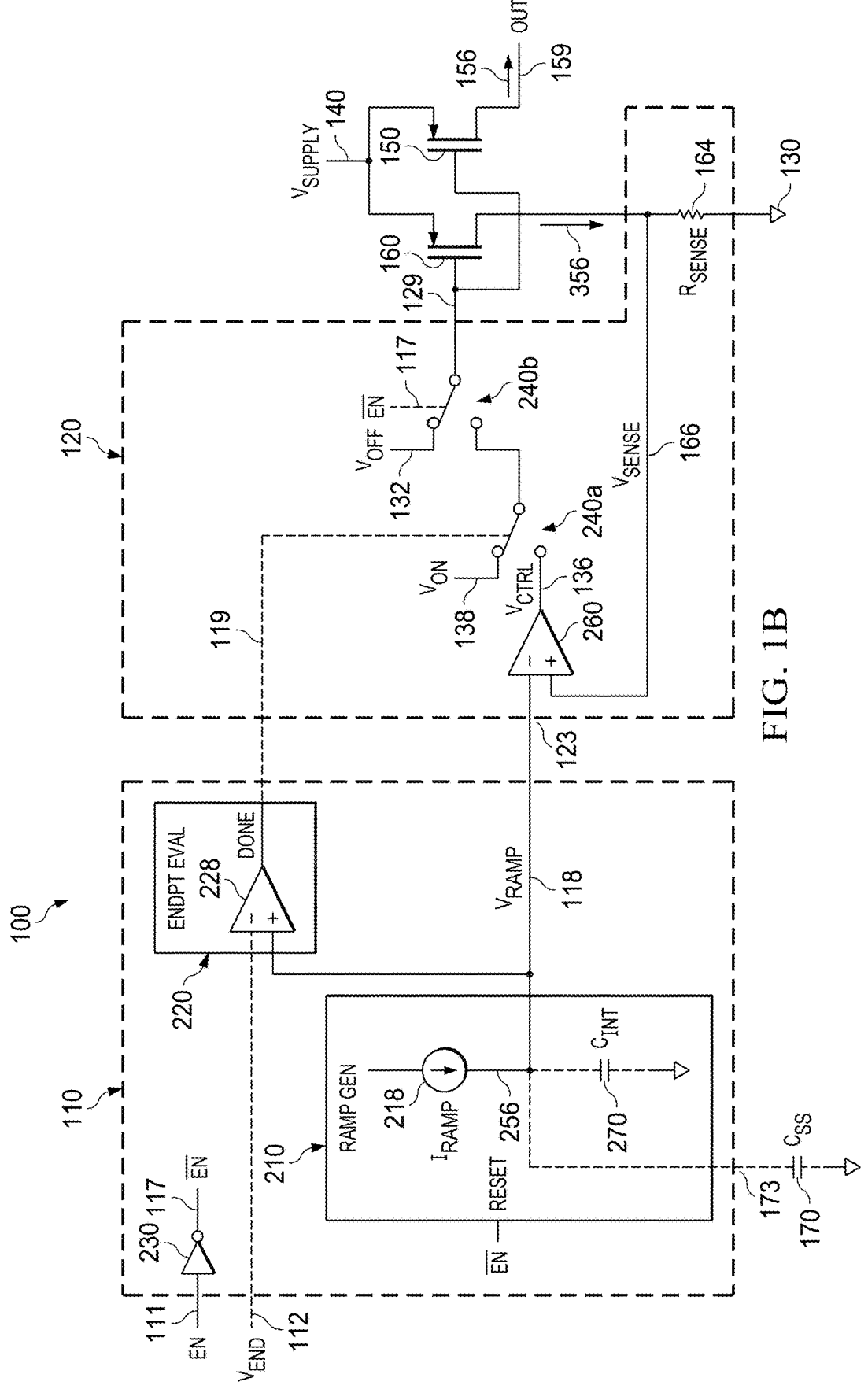
FIG. 1B is a more detailed schematic block diagram of a load switch having current-ramping soft start.

FIG. 1B is a more detailed schematic block diagram of the load circuit 100 that was just described with reference to FIG. 1A, showing more detail of the inner workings of gate control circuit 110 and gate drive circuit 120. Gate control circuit 110 includes enable logic 230, which, in this case, simply inverts enable signal 111 (EN) to produce inverted enable signal 117 (EN_BAR); ramp generator 210; and endpoint evaluation circuit 220. In the illustrated embodiment, ramp generator 210 generates a ramp signal 118 with linearly increasing ramp voltage $V_{RAMP}$ by charging a capacitance with ramp current 256 from current source 218. The capacitance may optionally consist of integrated soft start capacitor 270, external soft start capacitor 170 connected to soft start connection 173, or both as shown with dashed lines. Using an external soft start capacitor 170 that dominates the total soft start capacitance has advantages in systems of multiple coordinated parallel load switches, as will be described later, and soft start connection 173 may be used in the interconnection and synchronization of parallel load switches. To generate the correct ramp signal 118, ramp generator 210 needs to be reset to a starting voltage (e.g., zero volts) when enable signal 111 (EN) is inactive, as indicated in FIG. 1B by EN_BAR entering a ramp generator input labeled RESET. Power-on reset (POR) functions commonly incorporated in a load switch IC may also be used for resetting the ramp signal 118 and discharging any associated soft start capacitance, although circuitry required to implement POR is not shown in the figures.

Endpoint evaluation circuit 220 generates a DONE signal 119 which changes from inactive to active to end the soft start period. In the illustrated embodiment, ramp voltage $V_{RAMP}$ at a ramp voltage node carrying ramp signal 118 is compared to an endpoint voltage 112 (which may optionally originate externally, as indicated by the dashed line) by voltage comparator 228 to generate DONE signal 119. Endpoint voltage 112 is selected to correspond to a gate drive voltage 129 that drives power device 150 to a predetermined target current capability at the end of the soft start ramp. Other embodiments of endpoint evaluation circuit 220, using different criteria to determine the state of DONE signal 119 are also possible, that do not necessarily employ a voltage comparator 228 to determine the state of DONE signal 119. For example, sensing the voltage VOUT across the load at output 159 could be used, switching DONE signal 119 to active when VOUT approaches $V_{SUPPLY}$ within a certain tolerance, such as 100 mV, and possibly requiring that a voltage difference be maintained within this tolerance for a certain minimum time period. As another example, when the target current capability is reached, a time delay could be started to wait until the load capacitance is fully charged before switching power device 150 fully on. However implemented, DONE signal 119 should be inactive when the load switch is disabled (i.e., enable signal 111 (EN) is inactive) and during the soft start period, and should transition to active only after soft start ramp signal 118 has reached a target current capability.

Gate drive circuit 120 performs the functions necessary to generate gate drive signal 129 to turn power device 150 on and off and to perform a soft start. It accepts enable signals 111 and/or 117, ramp signal 118, and DONE signal 119 to choose what voltage for gate drive signal 129 to drive at what times. The functions performed by gate drive circuit 120 are indicated in this simplified schematic block diagram using SPDT switches 240a and 240b and feedback amplifier 260. A gate drive voltage 132 ($V_{OFF}$) that ensures that the power device 150 is fully off is supplied when the load switch is disabled: i.e., when inverted enable signal 117 (EN_BAR) is active, using switch 240b to connect OFF drive voltage 132 ($V_{OFF}$) to the gates of reference device 160 and power device 150, thereby cutting off output current

156 and servo current 356. During the soft start ramp, enable signal 111 (EN) is active and DONE signal 119 is inactive, connecting control voltage 136 ($V_{CTRL}$) through switches 240a and 240b to the gates of reference device 160 and power device 150 to drive them under closed-loop control from feedback amplifier 260. Feedback signal 166 in this embodiment is a sense voltage $V_{SENSE}$ obtained from servo current 356 through sense resistor 164. Feedback amplifier 260 adjusts control voltage 136 ($V_{CTRL}$), which during soft start ramp is the gate drive voltage 129, so as to track (i.e., follow) ramp signal 118. When the soft start ramp period is done, as indicated by an active DONE signal 119, switch 240a under control of DONE signal 119 is switched from control voltage 136 ($V_{CTRL}$) to an ON drive voltage 138 ($V_{ON}$) that turns power device 150 fully on, or at least to its full rated current capability, which can be defined as a current at which continuous operation of power device 150 results in a temperature rise that will not trigger protective thermal shutdown circuit 180 to turn off the load switch. ON drive voltage 138 ($V_{ON}$) preferably turns power device 150 fully on, in order to minimize its drain-source on resistance $R_{DS(on)}$ during continuous operation.

Figure 2:
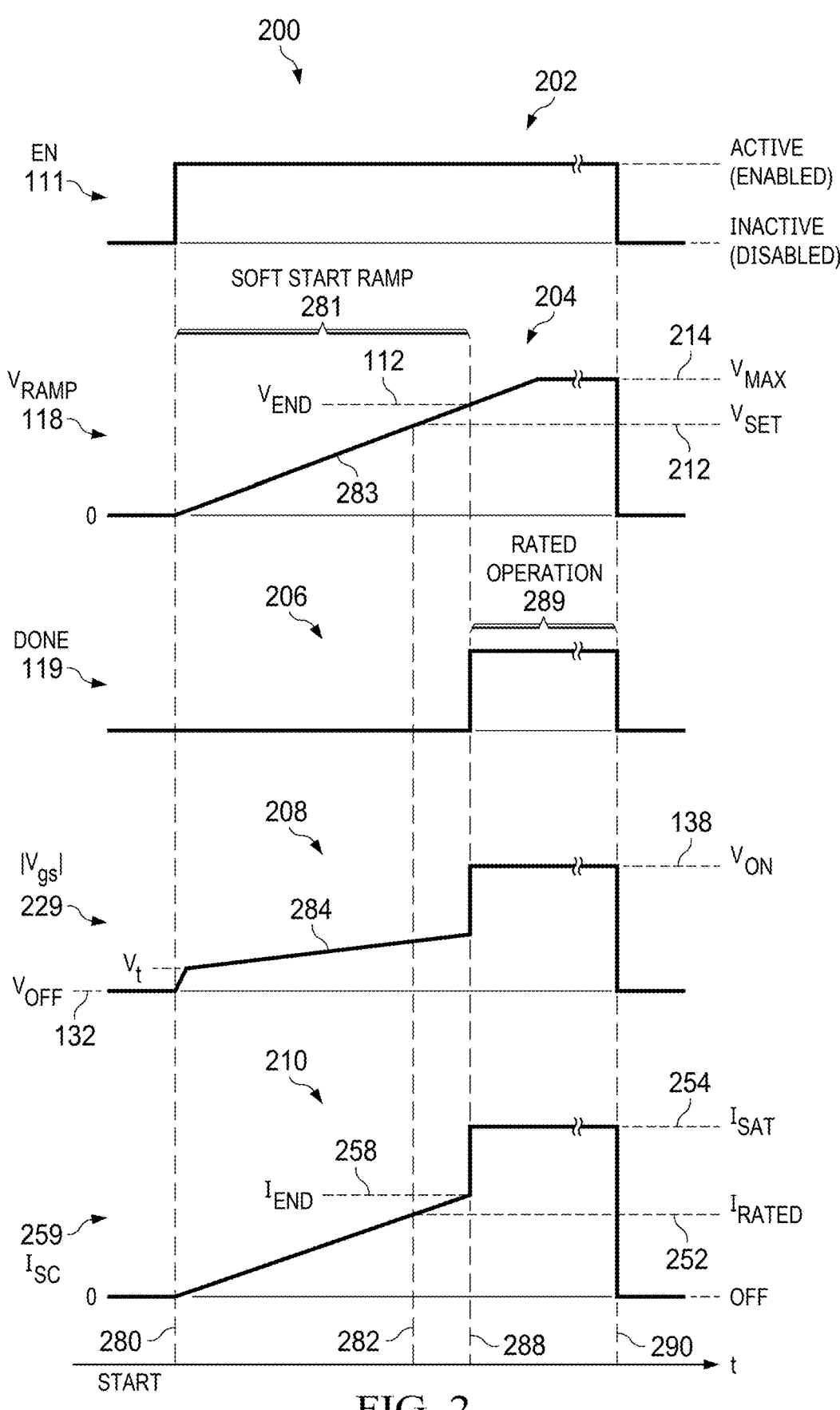
FIG. 2 is are plots of voltage or current vs time, showing waveforms associated with operation of a load switch having current-ramping soft start.

Before proceeding with a more detailed description of an exemplary circuit embodiment, explanations of typical waveforms 200 associated with operation of a load switch 100 having current-ramping soft start will be provided. Refer now to FIG. 2, which shows plots of significant exemplary signal voltages or currents versus time for an embodiment like that in FIG. 1B. Although there is no particular overall scale for the time axis, plots 202, 204, 206, 208, and 210 are aligned to each other with respect to the time axis t so as to make clear the synchronization of the various signals. Plot 202 shows digital enable signal 111 (EN) vs. time, which when active enables operation of power device 150, and when inactive disables operation and turns off power device 150. The curved "break lines" at the upper right in the active portion of enable signal 111 (EN) indicate an indefinite length of time in which the enable signal may be held high to control the load switch; similar break lines appear in all of the waveforms.

Plot 204 shows ramp signal 118 as a plot of ramp voltage $V_{RAMP}$ vs. time; when enable signal 111 (EN) is inactive, ramp signal 118 is reset to zero volts. (This is an exemplary ramp signal; in some embodiments, the ramp voltage may be reset to another value that causes gate drive signal 129 to turn power device 150 fully off.) When enabled at START time 280, at which enable signal 111 (EN) transitions from inactive to active, voltage ramp waveform 283 starts increasing gradually with time, corresponding to a soft increase of voltage drive and hence current capability of power device 150 and reference device 160. Ramp waveform 283 as shown increases linearly with time, as would ramp voltage 118 generated using a constant current source 218 charging a soft start capacitor 170 (or internal soft start capacitor 270, or both). However, a ramp signal having a differently-shaped waveform that may vary nonlinearly, and that also increases gradually (and preferably monotonically) is possible. A ramp signal can be generated using an alternative type of ramp generator in some systems, e.g., in order to better synchronize ramp signals. For example, a voltage source charging a capacitor may generate a ramp signal that exponentially approaches a limit with an RC time constant, or a ramp waveform 283 that linearly increases might be generated using a digital counter and DAC. Ramp waveform 283 extends over a duration at least equal to a soft start ramp period 281, which ends at soft start finish time 288 when ramp signal 118 reaches endpoint voltage 112 ($V_{END}$), corresponding to a target current capability of power device 150. In some embodiments, endpoint voltage 112 is preferably selected so that it is greater than rated voltage 212 ($V_{SET}$), which is a ramp voltage corresponding to the rated current capability of power device 150, so that the time 282 at which the instantaneous current capability of power device 150 reaches its rated current capability occurs before the soft start finish time 288. This allows for the capacitance of the load to be fully charged at a current that can exceed the continuous rated current capability, albeit a limited current and for a limited soft start ramp time period 281 unlikely to result in overheating or thermal shutdown. Voltage ramp signal 118 is shown in plot 204 to be limited ("clamped") to a maximum ramp voltage 214 ($V_{MAX}$) after the end 288 of soft start ramp period 281. This limits the maximum potential of the ramp voltage ($V_{RAMP}$) such that all circuitry connected to it internally and externally can utilize lower-voltage components.

The choice of soft start ramp speed depends on the requirements of the application of load switch 100. The duration of soft start ramp period 281, which using the ramp generator 210 of FIG. 1B is determined by the magnitude of ramp current 256 ($I_{RAMP}$) and the value of capacitance at the ramp voltage node (soft start capacitors 170 and/or 270, in parallel with any other capacitances connected to soft start connection 173). The increase of ramp signal 118 at the ramp voltage node (at the soft start connection 173 in FIG. 1B) should not be too fast, i.e., the duration of soft start ramp period 281 should not be too short, in order to limit the surge (inrush) current into the load. A slower ramp signal allows a thermal protection circuit to more readily follow the device temperature. A longer soft start ramp period also helps ensure that the load capacitance, which may not be known apriori to a designer of a load switch, gets more fully charged during the soft start before switching power device 150 on for continuous operation, helping to prevent a surge (inrush) current upon switching to fully on, and also enforcing more even power sharing between paralleled load switches during the soft start ramp. However, since during the soft start ramp period 281 reference device 160 and power device 150 are operating in saturation, more heating of the devices occurs during a slower ramp. An optimal soft start ramp period thus depends on the application in which load switch 100 is used; certain loads, for example, an FPGA, might specify a particular slew rate for the supply voltage during startup. With typical load capacitances on the order of 100 nanofarad (100 nF, a local bypass capacitance often used with a linear power supply as the load) to one microfarad (1 μF, a larger bypass capacitance frequently used with a switching power supply load), soft start ramp periods in the range of approximately one hundred microseconds to approximately ten milliseconds might be used.

Plot 206 of DONE signal 119 vs. time shows that endpoint evaluation circuit 220 is configured so that DONE signal 119 is inactive when enable signal 111 (EN) is inactive, and remains inactive during soft start ramp period 281, until the soft start finish time 288, at which DONE signal 119 transitions from inactive to active, starting a rated operation phase 289. Rated operation, also referred to herein as "continuous operation," during which power device 150 is operated fully enhanced (fully on), persists until enable signal 111 (EN) becomes inactive, commanding the load switch to turn off power to the load, or one or more fault protection mechanisms signal gate control circuit 110 to cause power device 150 to be turned fully off in a similar response to an inactive enable signal 111 (EN).

A waveform corresponding to that of gate drive signal 129 is shown in plot 208 of a gate drive voltage vs. time. Since in the illustrated embodiments, power device 150 and reference device 160 are PMOS transistors, they are turned on more fully by lower (more negative) gate drive voltages. To display a gate drive waveform 284 that appears to increase upward with a higher abscissa, the absolute value of gate-to-source voltage 229 ($|V_{gs}|$) is plotted as a function of time, so that when this value increases, the devices are turned on more fully. When enable signal 111 (EN) is inactive, gate drive voltage 229 is set to OFF drive voltage 132 ($V_{OFF}$) appropriate to turn power device 150 fully off, blocking current flow from supply connection 140 to a load at output 159. When enable signal 111 (EN) turns active at start time 280, the feedback circuit acts to quickly raise the gate drive voltage 229 to the threshold voltage $V_t$ of reference device 160 (and hence of power device 150) so as to start passing a nonzero sensing servo current 356, resulting in a nonzero instantaneous current capability of power device 150. Gate drive voltage waveform 284 increases slowly during soft start ramp period 281; depending on the characteristics of reference device 160, the shape of waveform 284 might not be strictly linear even if the ramp signal 118 voltage ($V_{RAMP}$ waveform 283 in plot 204) rises linearly. Regardless of device nonlinearities and threshold voltages, feedback control operates so as to supply whatever control voltage 136 ($V_{CTRL}$) is required to drive the gate of reference device 160 to force feedback signal 166 voltage ($V_{SENSE}$ in FIG. 1B) to follow ramp signal 118. When DONE signal 119 signals that the endpoint voltage 112 ($V_{END}$) has been reached (or in some embodiments, some other signal indicates reaching a target current capability for power device 150), gate drive voltage 229 is switched to an ON drive voltage 138 ($V_{ON}$) that turns power device 150 fully on.

Plot 210 graphs short-circuit current 259 in power device 150 vs. time as a proxy that indicates its instantaneous current capability. Current capability starts at zero when enable signal 111 (EN) is inactive at start time 280, and follows voltage ramp waveform 283 (due to feedback control) until soft start finish time 288, when target current capability 258 ($I_{END}$) is reached, at which time the gate drive voltage 229 is increased to turn power device 150 fully on, so that its short-circuit current capability is equal to its saturation current 254. As discussed earlier, target current capability 258 ($I_{END}$) optionally (but preferably) exceeds rated current 252 ($I_{RATED}$). An example suitable value for a target current capability 258 is 125% of rated current 252. In such cases, the current capability ramp extends to soft start finish time 288, beyond the time 282 at which instantaneous current capability reaches rated current 252. Driving power device 150 to be fully enhanced allows it to operate at a minimum drain-source on resistance $R_{DS(on)}$, for maximum current to the load and minimum internal heating when switched fully on. Although maximum current is theoretically $I_{SC} = V_{SUPPLY}/R_{DS(on)}$, in actuality, due to the availability of very low values for $R_{DS(on)}$ (e.g. sub-100 mohm in an integrated PMOS) and high-voltage supplies (e.g. up to 50 V), power device 150 will typically saturate at a lower current than the theoretical maximum current. Load switch 100 operates in this state of continuous operation until disabled by enable signal 111 (EN) going inactive at some future time 290.

Figure 3:
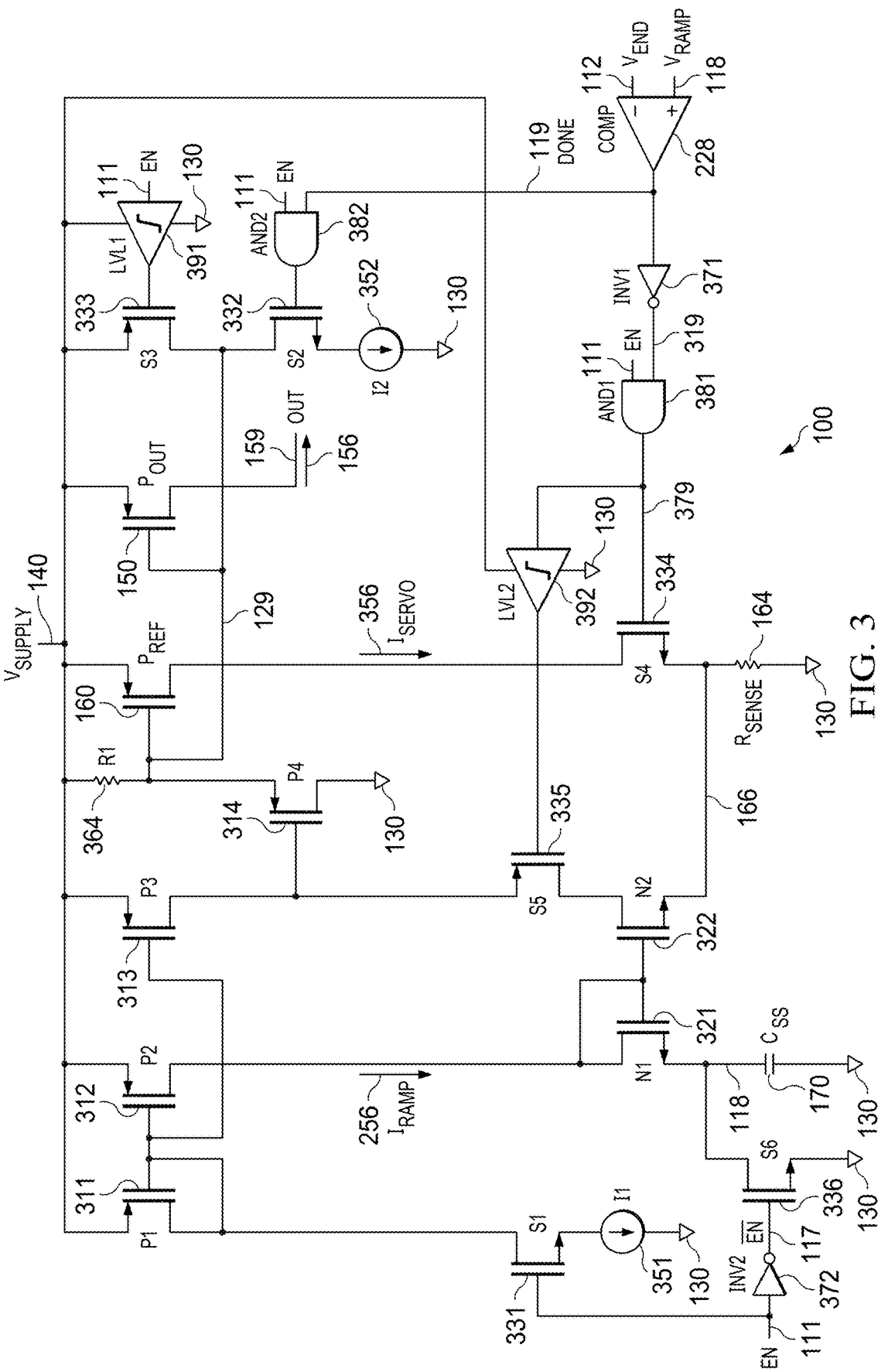
FIG. 3 is a detailed schematic circuit diagram of a load switch having current-ramping soft start.

FIG. 3 is a more detailed schematic circuit diagram of a load switch 100 having current-ramping soft start, showing one possible CMOS integrated circuit implementation of the schematic block diagram of FIG. 1B. What follows is a brief explanation associating individual circuit elements with the functions they perform to implement the functional blocks in FIG. 1B. To avoid clutter in the drawing, groups of circuit elements associated with the functional blocks are not explicitly delineated in the drawing, with e.g. dashed outlines and functional block reference numerals.

Enable logic 230 is distributed throughout the schematic, wherever enable signal 111 appears as an input. Reference device 160 ($P_{REF}$) and power device 150 ($P_{OUT}$) and their connections to gate drive 129, supply voltage 140, and output 159 appear at the top center of the schematic. Reference device 160 ($P_{REF}$) may be sized with a smaller W/L ratio than power device 150 ($P_{OUT}$) to optimize the circuit area used as well as to optimize the overhead current required to operate the circuit. Ramp generator 210 includes the current mirror pair of PMOS transistors 311 (P1) and 312 (P2), which mirror current source 351 (I1) into ramp current 256 ($I_{RAMP}$) when enable signal 111 (EN) is active to turn on NMOS switch 331 (S1). PMOS transistor 311 (P1) need not be identical in size to PMOS 312 (P2), and can be scaled as desired to adjust ramp current 256 proportional to current source 351 (I1). Ramp current 256 also serves as a tail current for NMOS transistor 321 (N1), which is part of the differential input pair for feedback amp 260, as will be discussed later. Ramp current 256 passes through transistor 321 (N1) to charge soft start capacitor 170 ($C_{SS}$) and generate ramp signal 118 at that ramp voltage node. Enable signal 111, when inactive, is inverted by inverter 372 (INV2) to generate an inverted enable signal 117 (EN_BAR) that turns on NMOS transistor switch 336 (S6) to discharge soft start capacitor 170 ($C_{SS}$, which may be internal or external as discussed earlier) to a starting voltage of zero volts for the start of a soft start ramp.

Feedback amp 260 (as shown in FIG. 1B) used in the soft start feedback circuit is implemented primarily by circuit elements to the left of the schematic center line, and includes common-gate differential input pair of NMOS transistors 321 (N1) and 322 (N2), preferably matched, using their sources as inputs. PMOS transistors 312 (P2) and 313 (P3) supply tail current to the input pair; again, although PMOS 313 preferably matches PMOS 312 to balance tail currents to the input pair, PMOS 312 (P2) and PMOS 313 (P3) need not match PMOS 311 (P1) if it is useful in some embodiments to scale currents with respect to current source 351 (I1). Ramp signal 118 is applied to the input (source) of NMOS 321 (N1), while a voltage developed across sense resistor 164 ($R_{SENSE}$) by servo current 356 ($I_{SERVO}$) is applied to the input (source) of NMOS 322 (N2). The total gain of feedback amp 260 is determined by the value of sense resistor 164 ($R_{SENSE}$), as well as gain contributions from output source follower PMOS 314 (P4) and PMOS reference device 160 ($P_{REF}$).

Endpoint evaluation circuit 220 (as shown in FIG. 1B) is implemented in FIG. 3 by several circuit elements on the right-hand side of the schematic. Comparator 228 accepts ramp signal 118 ($V_{RAMP}$) and endpoint voltage 112 ($V_{END}$) to generate DONE signal 119. This signal is processed further by logic inverter 371 (INV1) to generate "NOT DONE" signal 319; by AND gate 381 (AND1) with enable signal 111 to generate "enabled and NOT DONE" signal 379; and by AND gate 382 (AND2) to generate an "enabled and DONE" signal. These gate control signals are used by circuit elements in gate drive circuit 120 (as shown in FIG. 1B) as follows:

Enable signal 111 is translated by level shifter 391 (LVL1) into a drive voltage that operates PMOS transistor switch 333 (S3), which performs the function of switch 240b in FIG. 1B. When enable signal 111 is inactive (disabled), PMOS 333 (S3) is turned on to connect the gates of PMOS power device 150 ($P_{OUT}$) and reference device 160 to supply voltage 140, which is an OFF drive voltage $V_{OFF}$ sufficient to turn them fully OFF.

The functions of switch 240a in FIG. 1B are performed together by NMOS switch 332 (S2), NMOS switch 334 (S4), and PMOS switch 335 (S5). Switch 332 (S2) turns on when enabled and DONE, allowing current source 352 (I2) to develop gate drive voltage 129 (=I2 times R1) across resistor 364 (R1) equal to an ON drive voltage 138 ($V_{ON}$) sufficient to turn on power device 150 ($P_{OUT}$) fully on.

When "enabled and not done" signal 379 is active, the soft start feedback circuit is enabled by (a) turning on NMOS switch 334 (S4) to connect servo current 356 from reference device 160 ($P_{REF}$) to sense resistor 164 ($R_{SENSE}$), and (b) via level shifter 392 (LVL2), driving the gate of PMOS switch 335 (S5) to a level sufficient to pass the tail current of NMOS input transistor 322 (N2) and allow source follower PMOS 314 (P4) to turn on reference device 160 ($P_{REF}$) as needed to operate the feedback loop. PMOS switch 335 (S5) disables the feedback loop when not in the soft start ramp period, and helps prevent overstress on gates if the feedback loop rails out when $V_{SUPPLY}$ is a high voltage. The output voltage of level shifter 392 (LVL2) is set so that when "enabled and not done" signal 379 is active, switch 335 (S5) is driven with a gate drive voltage that allows feedback signal 166 to pull the gate of PMOS 314 (P4) sufficiently below the supply voltage 140 such that the gate of reference device 160 can be driven to supply a servo current 356 of at least $I=V_{END}/R_{SENSE}$; and when "enabled and not done" signal 379 is inactive, to turn off switch 335 (S5).

When signal 379 is inactive (disabled or DONE), switch 335 (S5) turns off source follower PMOS 314 (P4) to stop the loop from turning on reference device 160 ($P_{REF}$), and also turns off switch 334 (S4) to stop needless current flow through reference device 160 ($P_{REF}$) when power device 150 ($P_{OUT}$) has been turned fully on by a gate drive voltage 129 of $V_{ON}$, or when disabled (enable signal 111 is inactive).

Additional circuit elements that are not required for basic soft start functionality, but that can improve performance in various ways, are not shown. For example, power supply rejection during the soft start ramp period can be improved by dynamic lowering of resistor R1 (e.g., by implementing R1 using a MOSFET and controlling it using the enable 111 and DONE 119 signals) during soft start to give the feedback loop more bandwidth to react to supply ripple and other disturbances. This requires more current through R1 from the feedback amplifier to develop the same gate drive voltage; but then R1 can be increased during continuous operation (gate drive voltage=full $V_{ON}$) to use a lower current I2 from current source 352, since only a stable $V_{ON}$ is required.

Embodiments of load switches according to the present invention can be implemented as an integrated circuit (not shown). A load switch integrated circuit is a semiconductor substrate (e.g., silicon), on a surface of which circuitry comprising active components such as transistors (e.g., PMOS and NMOS in a CMOS technology) and passive components such as resistors and capacitors are formed using IC fabrication technology. Components of load switch 100 that may be integrated into a load switch IC may include some or all of power device 150, reference device 160, gate control circuit 110, gate drive circuit 120, and optionally ramp generator 210 and soft start capacitor 270. A load switch IC typically has connections such as pads for wire bonds or solder bumps, used for interfacing the integrated circuitry to external signals like power 140, ground 130, output 159, enable 111, and soft start 173. In some embodiments, a load switch IC is packaged in an integrated circuit package that encapsulates the semiconductor substrate for protection from the environment and handling, the package having terminals (pads, leads, lands, or pins, etc.) connected to the power, ground, enable, output, soft start, and other connections, at a larger spacing or pitch than the connections on the integrated circuit substrate, thereby facilitating connection to other circuits and components when mounted on a higher-level interconnect such as a printed circuit board (PCB, or printed wiring board PWB) or incorporated into a multi-chip module (MCM). Load switch ICs need not include all of the functional blocks of load switch 100 shown in FIG. 1B, and in some embodiments may accept externally-generated signals such as ramp signal 118 or DONE signal 119 that may be shared between multiple load switch ICs in a system. On the other hand, load switch ICs may include additional circuitry for power management ICs that is known in the art and not described in detail herein, such as power-on reset (POR) circuitry and to implement various other fault protection or safety features such as current or voltage limiting, reverse current or voltage protection, over-temperature, overcurrent, or overvoltage detection, protection against electrostatic discharge (ESD), and/or circuitry to facilitate various applications, such as fault notification, signaling, and serial and/or parallel communications.

Figure 4A:
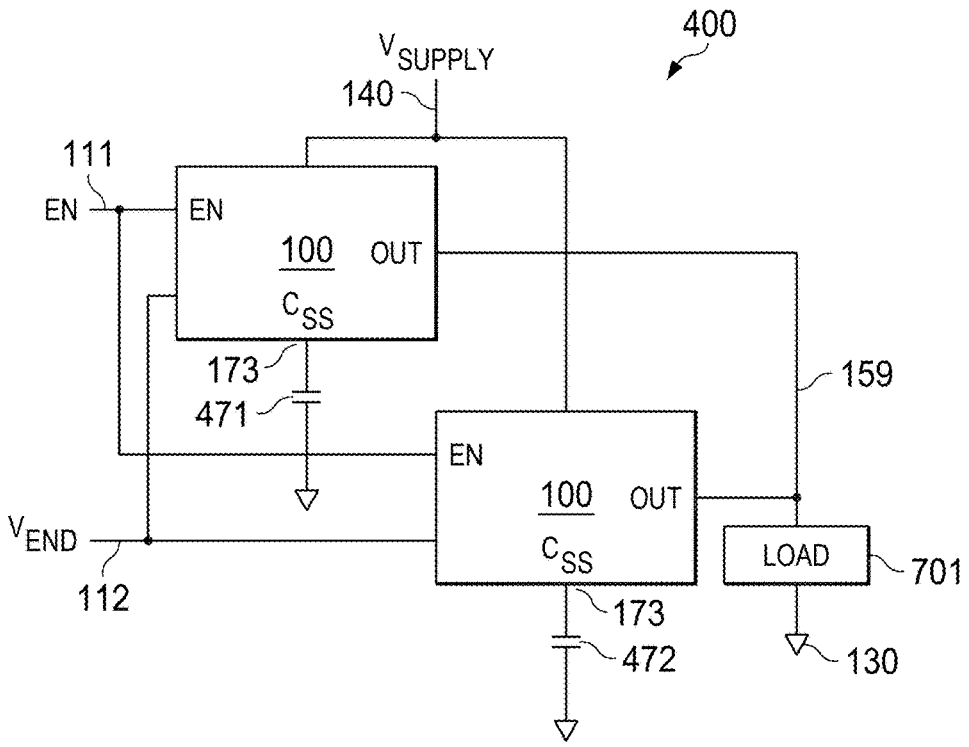
FIG. 4A is a schematic block diagram of a system of load switches connected in parallel to a single load.
Figure 4B:
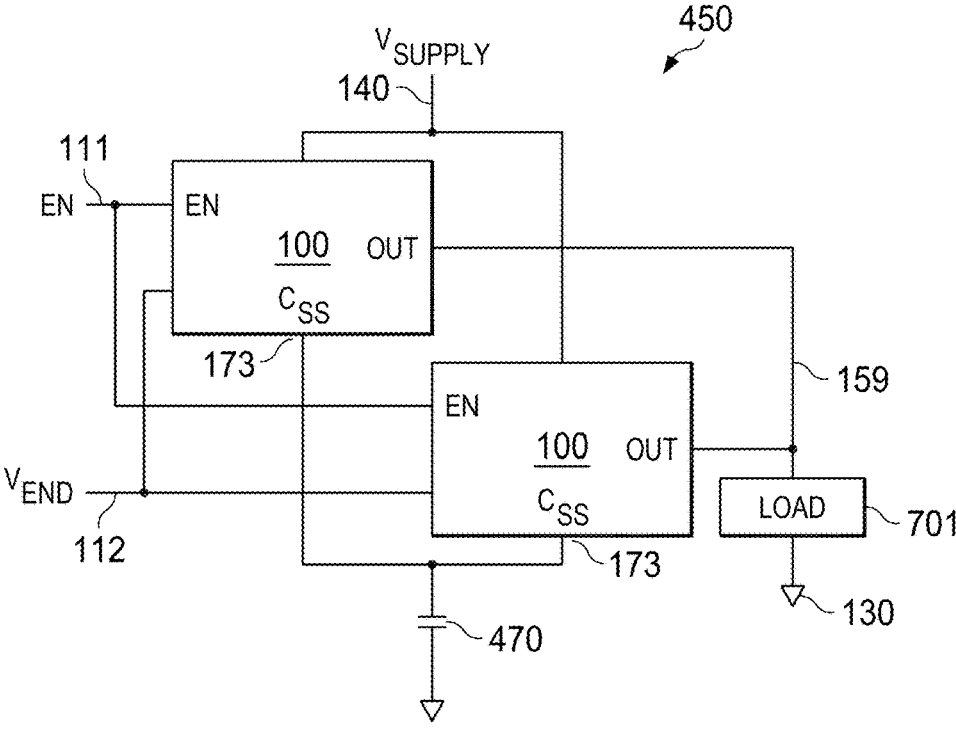
FIG. 4B is a schematic block diagram of a system of load switches sharing a single soft start capacitor and connected in parallel to a single load.

Inventive features of load switches and load switch integrated circuits described herein are particularly suited to operation in coordinated systems of load switches connected in parallel to a single load, as shown in FIGS. 4A and 4B. In such systems, balanced (even) sharing of current between the parallel-connected load switches is important in order to balance power dissipation for optimal scalability of power handling. Optimal scalability comes down to the need for fewer load switches in parallel to supply the same total load current, lowering system cost, increasing system reliability and robustness to thermal shutdown, and limiting defects due to current hogging. It is helpful to use load switch integrated circuits that are of the same type and have the same date code, i.e., that have been fabricated during the same wafer and assembly lots. Balancing power dissipation during continuous operation with power devices 150 turned fully on is not difficult, and mainly requires ensuring that the devices have similar on resistance $R_{DS(on)}$, through choosing devices from the same lot, careful PCB layout so that they see similar series parasitic resistance, and thermal layout that ensures that the devices operate at a similar temperature. But achieving current matching during a soft start ramp requires tight control of current capability and matching across parallel devices that cannot be obtained by simply ramping gate voltage individually, or even driving all power device gates with the same voltage ramp signal. Subtle differences between the power devices such as threshold voltage mismatch, junction temperature mismatch, and even gate drive voltage mismatches caused by parasitic PCB series resistances can cause current capability to vary significantly, thereby unbalancing power dissipation. The enhanced current ramp accuracy provided by the embodiments presented herein not only improves predictability in the behavior of a single load switch, but is critical in a system of multiple parallel load switches.

Referring now to FIG. 4A, a schematic block diagram is shown of a system 400 of two load switches 100 connected in parallel to switch power from supply 140 to their shared output 159 connected to a single load 701. Enable signal 111 is connected to the enable inputs on both load switches 100 so that they turn on and off in synchrony. Similarly, the same endpoint voltage 112 ($V_{END}$) is shown connected to both load switches, to emphasize that the same endpoint voltage should be used (whether an external endpoint voltage as shown, or carefully-matched endpoint voltage references integrated into load switches 100) to help synchronize the temporal and current capability endpoints of the soft start ramps in both load switches. The two load switches 100 have separate soft start capacitors 471 and 472 connected to their soft start "pin" connections 173, highlighting that in this example, the load switches have separate, matched, internal ramp generators as in FIG. 1B. Deviations from matching in the soft start ramps result from variation of the current sources 218 between units and tolerances on soft start capacitors 471 and 472, as well as feedback loop mismatches. Careful design and lot selection can probably meet a tolerance of about 5% on the ramp currents 256, and external capacitors are available with 1% tolerance, but perhaps 5% is available at a more reasonable cost for a capacitor having a value on the order of 1 nF. Variation in feedback amp offsets and circuit gains result in additional matching errors, especially at the start of the ramp where signals and currents are small and more affected by offsets. Thus, using independent soft start ramp generators and 5% tolerance capacitors, current capability matching may be expected to be on the order of 20% during the soft start ramp period.

FIG. 4B shows a schematic block diagram of a similar parallel system 450 of two load switches 100, but in this embodiment, load switches 100 share a single soft start capacitor 470 connected to both of their soft start connections 173. Sharing a soft start capacitor 470 obviously eliminates differences in the soft start voltage ramps due to capacitor tolerances. Since soft start connections 173 are internally connected to a ramp voltage node carrying the ramp signal 118, tying these nodes together means that all load switches 100 share a common ramp signal 118. Furthermore, current sources 218 in the different load switches 100 need not exactly match, since their currents sum to charge soft start capacitor 470, eliminating variations in the shared ramp signal due to mismatches between current sources 218. Assuming that endpoint voltage 112 ($V_{END}$) is the same, and all the current sources 218 in FIGS. 4A and 4B provide the approximately the same amplitude of current, the total ramp current charging capacitor 470 in FIG. 4B will be about twice that charging individual capacitors 471 and 472 in FIG. 4A; and thus, the value of capacitor 470 should be reduced to about half that of capacitor 471 or 472 to obtain a ramp signal 118 that extends over the same soft start ramp time period 281. To further synchronize soft start and obtain tight matching between load switches 100, the offset and gain of feedback amp 260 (in FIG. 1), as well as the value of sense resistor 164 ($R_{SENSE}$), can be trimmed in order to closely match closed-loop feedback circuit operation.

In systems 400 or 450 shown in either FIG. 4A or FIG. 4B, respectively, other possible embodiments employ an external ramp generator supplying a common ramp signal to soft start connection 173 on both load switches, obviating the need for duplicate internal ramp generators. In some embodiments, separate external ramp generators supplying carefully-matched ramp signals are also possible. And in some embodiments, endpoint evaluation might also be performed externally, providing an external (matched or common) DONE signal to a dedicated DONE input on each load switch 100. Although these variations might be useful in some systems, perhaps in providing power system redundancy, the embodiment using internal current sources 218 has the advantages just described, and allows load switches 100 and load switch ICs implementing their function to be manufactured identically and used either singly or in coordinated parallel systems.

Figure 5:
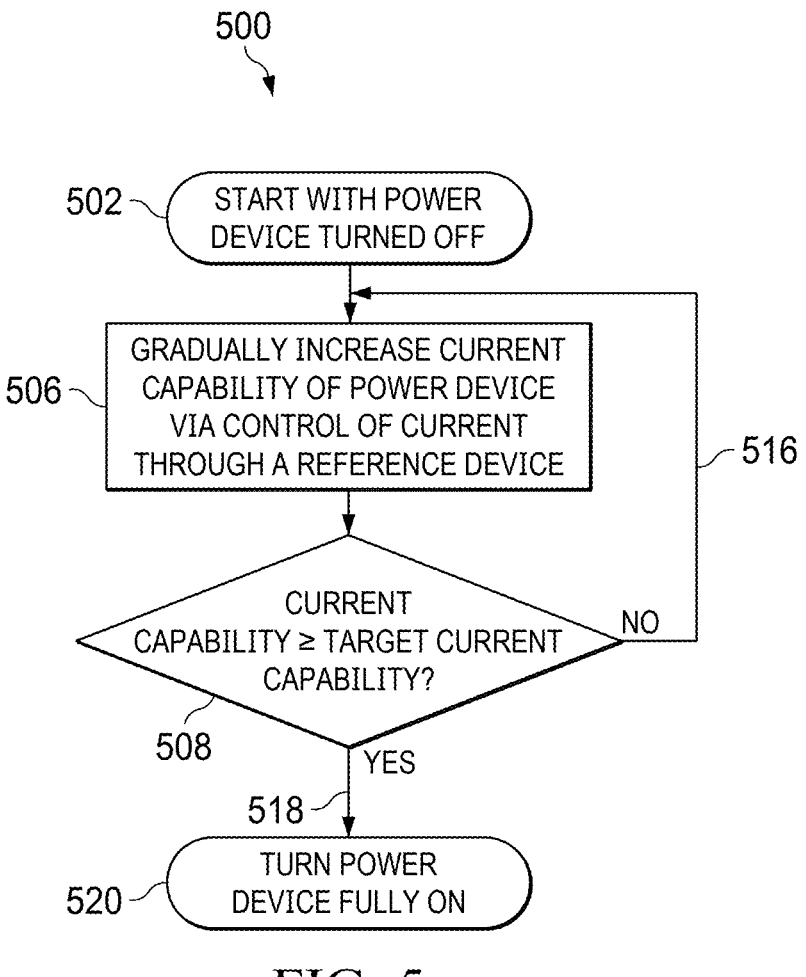
FIG. 5 is a flow chart of a method of performing a soft start of a load switch.

Referring now to FIG. 5, a flow chart of a method 500 of performing a soft start of a load switch is shown. The method starts with a power device having a rated current capability turned off in step 502. In step 506, the current capability of the power device is gradually increased over a soft start ramp period via closed-loop control of a current through a reference device to follow a ramp signal. The reference device preferably is of the same type as the power device and driven by the same gate drive voltage. Step 508 tests whether the current capability has reached a predetermined target current capability, and if it has not (NO), return path 516 has the method branching to step 506 in which the current capability continues to be increased while following the ramp signal. When the current capability equals or exceeds the target current capability (YES), step 508 permits the method to proceed via path 518 to the last step 520, in which the power device is turned fully on. In some embodiments of method 500, the target current capability is greater than the rated current capability. In some embodiments, the reference device is sized to have a lower current capability than the power device for the same gate drive voltage. In some embodiments, the ramp signal varies linearly over the soft start ramp period; this can be accomplished in some embodiments by charging a capacitor with a constant current source. In some embodiments, the soft start ramp period is in the range of approximately one hundred microseconds to approximately ten milliseconds.

Figure 6:
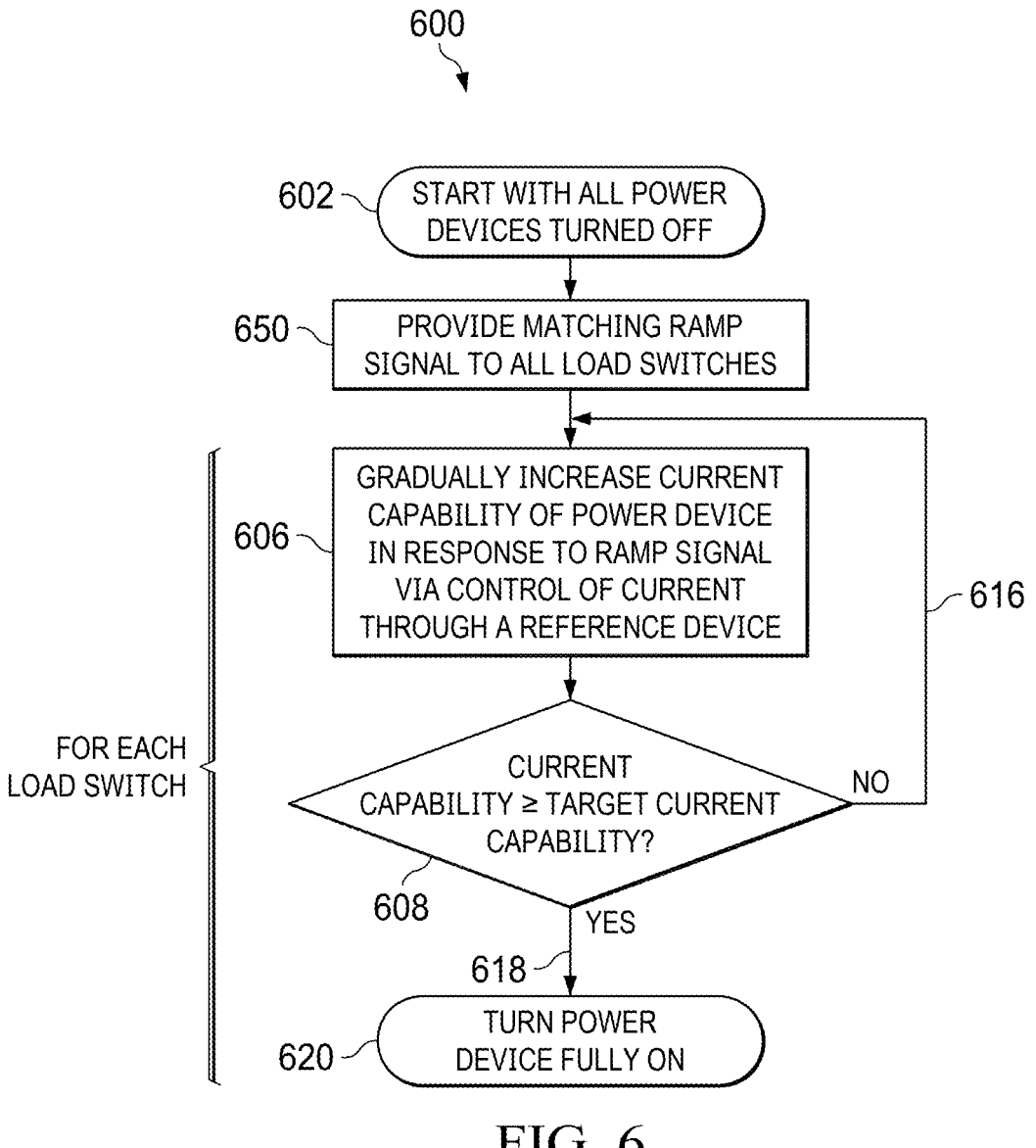
FIG. 6 is a flow chart of a method of coordinating the soft start of a system of load switches connected in parallel.

Finally, FIG. 6 shows a flow chart of a method 600 of coordinating the soft start of a system of a plurality of load switches connected in parallel to a load. In this case, the load switches each have a soft start connection, a power device with rated current capability, and gate drive circuitry, and have circuit and device parameters that are substantially matched to within predetermined tolerances. As in the previous method for a single load switch, method 600 starts in step 602 with the power devices in all the load switches turned off. In step 650, a matching ramp signal is provided to the soft start connection on each of the load switches. The remainder of method 600 requires all load switches to perform the following steps, which are substantially synchronized due to the matching ramp signal and the substantially matched circuit and device parameters. For each load switch, in step 606, the current capability of the power device is gradually increased in response to the ramp signal via closed-loop control of a current through a reference device of the same type as the power device and driven by the same gate drive voltage. Step 608 tests whether the current capability has reached a target current capability, and if not (NO), branch 616 returns the method to step 606. When the power device current capability meets or exceeds the target current capability (YES), test 608 allows the method to proceed along branch 618 to step 620, in which the power device is turned fully on.

In some embodiments of method 600, the target current capability is greater than the rated current capability. In some embodiments, the reference device is sized to have a lower current capability than the power device for the same gate drive voltage, whereby the reference device dissipates less power than the power device. In some embodiments, the ramp signal varies linearly over the soft start ramp period; this can be accomplished in some embodiments by charging a capacitor with a constant current source. In this situation, a single soft start capacitor connected to each of the soft start connections can be shared by load switches to eliminate differences in ramp signals, since variations caused by the separate current sources (which are summed, in embodiments in which the ramp voltage nodes are connected together) and capacitor tolerances are eliminated using a single capacitor in this way. In some embodiments, the soft start ramp period is in the range of approximately one hundred microseconds to approximately ten milliseconds.

While the present invention has been particularly shown and described in detail in the foregoing specification with reference to preferred embodiments thereof, it will be evident that various modifications and changes may be made thereto without departing from the broader spirit and scope of the invention as set forth in the appended claims. For example, the power device and reference device could be different types of transistors from MOSFETs, possibly current-controlled instead of voltage-controlled; and the ramp signal could be a control current instead of a control voltage, while the feedback amplifier could be a current-controlled voltage amplifier to control voltage-controlled power and reference devices, or even a current-controlled current source to control current-controlled power and reference devices. Ramp signals that are shown in exemplary embodiments as increasing over time could instead decrease (move toward lower or more negative voltages or currents) with time, with appropriate surrounding circuitry adapted to work with this polarity. Alternative embodiments are possible in which devices 150 and 160 are connected as a current mirror, and a current sink is ramped through reference device 160, instead of using servo current 356 in a feedback circuit tracking a ramp signal. This would generate a ramp for the instantaneous current capability of power device 150, but since it does not have reference device 160 in a feedback loop, this approach would not provide as accurate a current control.

While exemplary embodiments shown herein use a PMOS power device as a high-side switch between power supply and load, the same principles can be applied to a low-side switch, e.g., using an NMOS power device connected between the load and ground. The power and reference devices as well as control and drive circuitry could be implemented in a variety of integrated circuit technologies other than MOS or CMOS as used in the illustrative embodiments.

Besides load switches, the concepts provided herein may be applied separately and usefully in various other power management applications. Other applications of these techniques will also be apparent, and therefore the scope of the invention is much broader than the few specific examples described herein. The specification and drawings are, accordingly, to be regarded in an illustrative rather than a restrictive sense.

I claim:

1. A load switch connecting a power supply to a load and having current-ramping soft start, comprising:

a power device controlling a load current from the power supply to the load, comprising a type of MOS transistor having a gate driven by a gate drive voltage, and having a rated current capability for continuous operation and an instantaneous current capability;

a reference device of the same type as the power device and having a gate driven by the gate drive voltage, the reference device configured to pass a servo current proportional to the instantaneous current capability of the power device;

a gate control circuit accepting an enable signal that can be inactive or active, and also accepting an endpoint voltage selected to correspond to a target current capability of the power device, comprising a ramp generator generating a ramp signal comprising a ramp voltage at a ramp voltage node that is reset to a starting voltage corresponding to the power device being fully off when the enable signal is inactive, and that varies gradually from the starting voltage to the endpoint voltage during a soft start ramp period that starts when the enable signal changes from inactive to active and that ends when the power device instantaneous current capability reaches the target current capability, and an endpoint evaluation circuit generating a DONE signal that is inactive while the enable signal is inactive as well as during the soft start ramp period and that transitions from inactive to active at the end of the soft start ramp period; and a gate drive circuit providing the gate drive voltage and having inputs accepting the enable signal, the ramp signal, and the DONE signal, comprising a feedback circuit and configured to turn the power device fully off when the enable signal is inactive, turn the power device fully on when both the enable signal and the DONE signal are active, and during the soft start ramp period, control the servo current to track the ramp voltage using the feedback circuit, so as to gradually increase the instantaneous current capability of the power device from fully off to the target current capability, whereby the power device is operated as a current source having a limited current capability that gradually increases during the soft start ramp period, charging a capacitance of the load with a limited inrush current before switching to drive the power device fully on for continuous operation.

2. The load switch of claim 1, wherein the reference device is sized to have a lower current capability than the power device for the same gate drive voltage.

3. The load switch of claim 1, wherein the power device and reference device are PMOS transistors.

4. The load switch of claim 1, wherein the ramp generator comprises a current source that charges a soft start capacitor connected to the ramp voltage node.

5. The load switch of claim 1, wherein the ramp voltage varies nonlinearly with time.

6. The load switch of claim 1, wherein the endpoint evaluation circuit compares the ramp voltage to the endpoint voltage to generate the DONE signal, which transitions from inactive to active when the ramp signal reaches the endpoint voltage.

7. The load switch of claim 6, wherein the target current capability exceeds the rated current capability by at least 20 percent.

8. The load switch of claim 1, wherein the target current capability is greater than the rated current capability.

9. The load switch of claim 1, wherein the length of the soft start ramp period is between approximately one hundred microseconds and approximately ten milliseconds.

10. A load switch integrated circuit having current-ramping soft start, comprising:

a semiconductor substrate having a surface; and a load switch circuit formed on the surface, wherein the load switch circuit comprises a power supply connection, a ground connection, a load connection, an enable connection accepting an enable signal that can be inactive or active, a soft start connection connected to a ramp voltage node, a power device controlling a load current from the power supply to the load, comprising a type of MOS transistor having a gate driven by a gate drive voltage, and having a rated current capability for continuous operation and an instantaneous current capability, a reference device of the same type as the power device and having a gate driven by the gate drive voltage, the reference device configured to pass a servo current proportional to the instantaneous current capability of the power device, a gate control circuit accepting the enable signal, an endpoint voltage selected to correspond to a target current capability of the power device, and a ramp signal from the ramp voltage node, wherein the ramp signal comprises a ramp voltage that is reset to a starting voltage corresponding to the power device being fully off when the enable signal is inactive, and varies gradually from the starting voltage to the endpoint voltage during a soft start ramp period that starts when the enable signal changes from inactive to active and that ends when when the power device instantaneous current capability reaches the target current capability, the gate control circuit comprising an endpoint evaluation circuit generating a DONE signal that is inactive while the enable signal is inactive as well as during the soft start ramp period and that transitions from inactive to active at the end of the soft start ramp period; and a gate drive circuit providing the gate drive voltage and having inputs accepting the enable signal, the ramp signal, and the DONE signal, comprising a feedback circuit and configured to turn the power device fully off when the enable signal is inactive, turn the power device fully on when both the enable signal and the DONE signal are active, and during the soft start ramp period, control the servo current to track the ramp voltage using the feedback circuit, so as to gradually increase the instantaneous current capability of the power device from fully off to the target current capability, whereby the power device is operated as a current source having a limited current capability that gradually increases during the soft start ramp period, charging a capacitance of the load with a limited inrush current before switching to drive the power device fully on for continuous operation.

11. The load switch integrated circuit of claim 10, wherein the reference device is sized to have a lower current capability than the power device for the same gate drive voltage.

12. The load switch integrated circuit of claim 10, wherein the power device and reference device are PMOS transistors.

13. The load switch integrated circuit of claim 10, wherein the endpoint evaluation circuit compares the ramp voltage to the endpoint voltage to generate the DONE signal, which transitions from inactive to active when the ramp signal reaches the endpoint voltage.

14. The load switch integrated circuit of claim 10, wherein the target current capability is greater than the rated current capability.

15. The load switch integrated circuit of claim 14, wherein the target current capability exceeds the rated current capability by at least 20 percent.

16. The load switch integrated circuit of claim 10, the load switch circuit further comprising a ramp generator that accepts the enable signal and generates the ramp signal at the ramp voltage node.

17. The load switch integrated circuit of claim 16, wherein the ramp generator comprises a current source charging a capacitance at the ramp voltage node.

18. The load switch integrated circuit of claim 17, further comprising an integrated soft start capacitor connected to the ramp voltage node.

19. The load switch integrated circuit of claim 10, further comprising an integrated circuit package encapsulating the semiconductor substrate and having terminals connected to at least the power supply connection, the ground connection, the load connection, the enable connection, and the soft start connection on the load switch circuit.

20. A coordinated system of load switches having current-ramping soft start, comprising:

a plurality of load switches connected in parallel between a power supply and a load and all connected to an enable signal, each load switch comprising a soft start connection, connecting a ramp signal to a ramp voltage node in the load switch, a power device controlling a load current from the power supply to the load, comprising a type of MOS transistor having a gate driven by a gate drive voltage, and having a rated current capability for continuous operation and an instantaneous current capability, a reference device of the same type as the power device and having a gate driven by the gate drive voltage, the reference device configured to pass a servo current proportional to the instantaneous current capability of the power device, the ramp signal comprising a ramp voltage that is reset to a starting voltage corresponding to the power device being fully off when the enable signal is inactive, and varies gradually from the starting voltage to an endpoint voltage selected to correspond to a target current capability of the power device during a soft start ramp period that starts when the enable signal changes from inactive to active and that ends when the power device instantaneous current capability reaches the target current capability, an endpoint evaluation circuit that accepts the ramp signal and the endpoint voltage and generates a DONE signal that is inactive while the enable signal is inactive as well as during the soft start ramp period and that transitions from inactive to active at the end of the soft start ramp period, and a gate drive circuit providing the gate drive voltage and having inputs accepting the enable signal, the ramp signal, and the DONE signal, comprising a feedback circuit and configured to turn the power device fully off when the enable signal is inactive, turn the power device fully on when both the enable signal and the DONE signal are active, and during the soft start ramp period, control the servo current to track the ramp voltage using the feedback circuit, so as to gradually increase the instantaneous current capability of the power device from fully off to the target current capability, wherein parameters of at least the power devices, the reference devices, the ramp signals, the endpoint evaluation circuits, and the gate drive circuits are matched between the load switches within a set of tolerances sufficient to balance a power dissipation substantially evenly between the load switches within predetermined tolerances during the soft start ramp period as well as during continuous operation.

21. The system of claim 20, further comprising a ramp generator that accepts the enable signal and provides the ramp signal to the soft start connections of all the load switches.

22. The system of claim 20, each load switch circuit further comprising a ramp generator that accepts the enable signal and provides the ramp signal to the endpoint evaluation circuit and the gate drive circuit, wherein parameters of the ramp generators and the endpoint evaluation circuits are matched to within sufficiently tight tolerances so as to generate substantially matched and synchronized ramp signals and DONE signals.

23. The system of claim 22, wherein the ramp generator comprises a current source charging a capacitance at the ramp voltage node to generate the ramp signal.

24. The system of claim 23, wherein one soft start capacitor connected to the soft start connections is shared by all of the load switches.

\* \* \* \* \*